(12) United States Patent
Spindler et al.

(10) Patent No.: US 8,000,817 B2
(45) Date of Patent: Aug. 16, 2011

(54) FREQUENCY CONTROL IN CLOSED LOOP CONTROL SYSTEMS

(75) Inventors: Kent J. Spindler, Hugo, MN (US); Scott D. Thorson, Rosemount, MN (US); Robert J. Carlin, White Bear Lake, MN (US); Steven A. Cinnamon, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1048 days.

(21) Appl. No.: 11/575,540

(22) PCT Filed: Sep. 23, 2005

(86) PCT No.: PCT/US2005/034466
§ 371 (c)(1),
(2), (4) Date: Aug. 2, 2007

(87) PCT Pub. No.: WO2006/036905
PCT Pub. Date: Apr. 6, 2006

(65) Prior Publication Data
US 2007/0282466 A1    Dec. 6, 2007

Related U.S. Application Data

(60) Provisional application No. 60/613,160, filed on Sep. 24, 2004.

(51) Int. Cl.
*G05B 11/01* (2006.01)
*G05B 13/02* (2006.01)
*H03F 1/26* (2006.01)
*H04B 15/00* (2006.01)

(52) U.S. Cl. .......... 700/71; 700/32; 700/38; 700/42; 700/45; 700/54; 702/191

(58) Field of Classification Search .......... 700/28–30, 700/32, 38, 40–45, 54, 55, 71; 702/189–195; 318/632; 363/39
See application file for complete search history.

(56) References Cited

U.S. PATENT DOCUMENTS
4,251,735 A * 2/1981 Coleman .......... 307/46
(Continued)

FOREIGN PATENT DOCUMENTS
CN    85204471 U    7/1986
(Continued)

OTHER PUBLICATIONS

"Robust Two Degree of Freedom Regulators for Velocity Ripple Elimination of AC Permanent Magnet Motors", *2001 Institution of Electrical Engirieers*, 1995, Wai-Chuen Gan, Li Qiu, Abstract.
"Self-Learning Controller for the Compensation of Periodic Disturbances in Continuous Processing Plants", Martin Rau and Dierk Schröder, pp. 1276-1282, 2000 IEEE.
(Continued)

*Primary Examiner* — Crystal J Barnes-Bullock
(74) *Attorney, Agent, or Firm* — Douglas B. Little (57) ABSTRACT

Process controllers, methods, and systems provide for frequency control to account for the effects of periodic disturbances in the feedback signal of closed loop control systems. The frequency components of the feedback signal are determined, including the magnitude and phase of each. Waveforms for each frequency component are generated with substantially the same magnitude and substantially the opposite phase of each frequency component. The waveforms are then summed to produce a compensating waveform that is summed within the output of the control system so that the effects of the periodic disturbances are cancelled from the control system output being provided to the system under control.

15 Claims, 3 Drawing Sheets

U.S. PATENT DOCUMENTS

| | | | |
|---|---|---|---|
| 4,651,068 A | 3/1987 | Meshkat-Razavi | |
| 5,157,597 A | 10/1992 | Iwashita | |
| 5,228,070 A | 7/1993 | Mattson | |
| 5,412,302 A | 5/1995 | Kido et al. | |
| 5,557,640 A * | 9/1996 | Chadwick | 375/229 |
| 5,619,114 A * | 4/1997 | Blasko | 318/812 |
| 5,999,304 A * | 12/1999 | Sanders et al. | 359/237 |
| 6,075,350 A * | 6/2000 | Peng | 323/207 |
| 6,219,376 B1 | 4/2001 | Zhodzishsky et al. | |
| 6,597,146 B1 * | 7/2003 | Rehm et al. | 318/632 |
| 6,690,989 B2 | 2/2004 | Spindler et al. | |
| 6,697,767 B2 * | 2/2004 | Wang et al. | 702/189 |
| 6,711,360 B1 | 3/2004 | Wu | 398/182 |
| 6,865,232 B1 * | 3/2005 | Isaksson et al. | 375/260 |
| 7,035,124 B2 * | 4/2006 | Chadwick et al. | 363/40 |
| 7,633,839 B2 * | 12/2009 | Hanks | 369/44.29 |

FOREIGN PATENT DOCUMENTS

| | | |
|---|---|---|
| JP | 2002-59249 | 2/2002 |
| WO | WO 96/15583 | 5/1996 |

OTHER PUBLICATIONS

"Adaptive Algorithms for the Rejection of Sinusoida Disturbances With Unknown Frequency", *Automatica*, vol. 33, No. 12, pp. 2213-2221, 1997.

"A New Approach to Phase Cancellation in Repetitive Control", Harold Broberg and Richard Molyet, pp. 1768-1770, 1994 *Institution of Electrical Engineers*.

"An Adaptive Repetitive Control Scheme for Tracking Periodic Signals With Unknown Period", Proceedings of the American Control Conference, San Francisco, CA, Jun. 1993, pp. 1736-1740.

"Analysis and Synthesis of Discrete-Time Repetitive Controllers", *Journal of Dynamic Systems, Measurement, and Control*, Tomizuka et al, Sep. 1989, vol. 111, pp. 353-358.

"Nonlinear Control of an Electrohydraulic Injection Molding Machine via Iterative Adaptive Learning", Submitted to *Institution of Electrical Engineers /ASME Transactions on Mechatronics* Jul. 1998, Heather Havlicsek and Andrew Alleyne, pp. 1-25.

\* cited by examiner

FREQUENCY CONTROL IN CLOSED LOOP CONTROL SYSTEMS

CROSS REFERENCE TO RELATED APPLICATIONS

This application is a national stage filing under 35 U.S.C. 371 of PCT/US2005/034466, filed Sep. 23, 2005, which claims priority to Provisional Application No. 60/613,160 filed Sep. 24, 2004, the disclosures of which are incorporated by reference in their entirety herein.

TECHNICAL FIELD

The present invention is related to closed loop control systems. More particularly, the present invention is related to controlling disruptive frequencies within the feedback signal of closed loop control systems.

BACKGROUND

Closed loop control systems are employed to maintain a process variable of a system under control at a desired set point. For example, the speed of a motor is a process variable that is controlled to maintain the speed at the set point such as described in commonly owned U.S. Pat. No. 6,690,989. During operation, the process variable may differ from the set point due to various causes including environmental disturbances and changes in the physical characteristics of the system under control. The closed loop control system continuously measures the process variable via a feedback signal, and the closed loop control system generates a correction based on the deviation of the process variable of the feedback signal. The correction is intended to force the process variable back to the set point.

While the closed loop control system is effective at preventing the process variable from straying far from the set point, periodic disturbances may be present within the feedback signal that cause problems for the closed loop control system. These periodic disturbances may include actual periodic disturbances of the process variable that are not effectively handled by the closed loop control system and may also include periodic disturbances that appear as deviations from the set point and cause the closed loop control system to generate a correction to counter the deviation. However, the periodic disturbances are a by-product of physical characteristics of the system under control and/or of the sensors used to produce the feedback signal, and these periodic disturbances may or may not be actual deviations of the process variable. Therefore, when the correction is made, the result is that the process variable may not be as desired.

SUMMARY

Embodiments of the present invention address these issues and others by providing frequency control of the feedback signal to prevent the periodic disturbances in the feedback signal from causing an improper correction from being applied to the system under test and/or to further compensate for periodic deviations of the process variable not addressed by the closed loop control system. The frequency components of the feedback signal are found and a compensating waveform is generated such that there is compensation for the periodic disturbances otherwise included in the correction being applied by the closed loop control system to the system under control.

One embodiment is a process controller that includes an input receiving a feedback signal from a system under control. The process controller further includes a processor for calculating the magnitude and phase of each frequency component of the feedback signal and for computing a separate waveform for each frequency component wherein each waveform has a compensating magnitude and compensating phase relative to the corresponding frequency component. The process controller further includes an output generating each waveform and summing each waveform to a control signal output by a controller that acts upon the feedback signal to produce the control signal, wherein the summation of each waveform with the control signal compensates for the frequency components of the control signal.

Another embodiment is a method of eliminating the effects of periodic disturbances within a control system that involves sampling a feedback signal being produced by a system under control. The method further involves determining the frequency components and the magnitude and phase of each of the frequency components of the feedback signal. The method further involves generating a waveform for each frequency component that has a compensating magnitude and a compensating phase relative to each frequency component. Additionally, the method involves combining the waveforms for each of the frequency components to create a compensation waveform that is combined with a control signal, wherein the control signal is based on the feedback signal.

Another embodiment is a controlled system that includes a process controller that produces a compensation signal. The controlled system further includes a control system that produces a control signal and a system under control that receives a sum of the compensation signal and the control signal and that produces a feedback signal that is provided as input to the process controller and to the control system. The feedback signal comprises frequency components, and the process controller calculates the magnitude and phase of the frequency components to produce compensating waveforms that have a compensating magnitude and compensating phase in relation to the frequency components. The process controller outputs the sum of the compensating waveforms as the compensation signal.

DETAILED DESCRIPTION

Embodiments provide for the control of frequency components that are periodic disturbances within a feedback signal.

Accordingly, compensation is provided for the periodic disturbances to reduce the degree of improper corrections being provided to a system under control and/or to address periodic deviations of the process variable not otherwise addressed by the closed loop control system.

Figure 1:
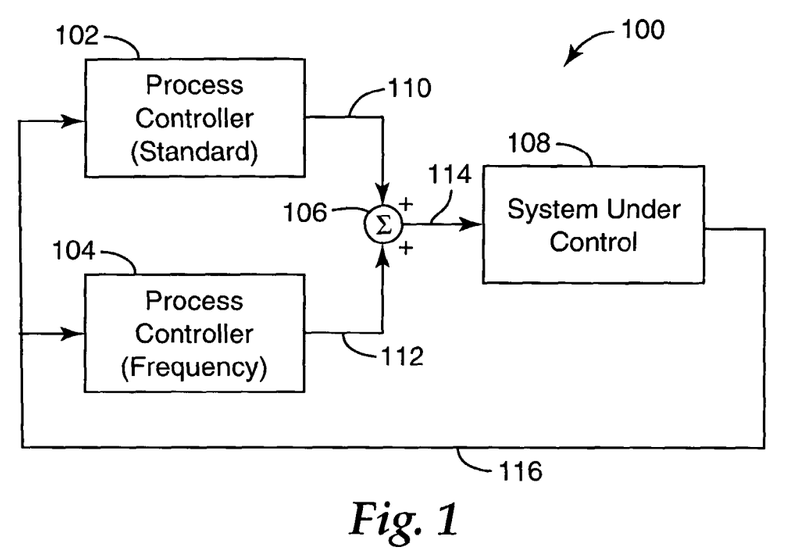
FIG. 1 shows an example of the configuration of a closed loop control system, a process controller that provides frequency control of a feedback signal, and the system under control.

FIG. 1 shows one example of a closed loop control system configuration 100. This configuration 100 includes a standard process controller 102, such as a proportional, integral, derivative (PID) controller. The configuration 100 also includes a process controller 104 that performs the frequency control. Additionally, the configuration 100 includes the system under control 108, such as a motor or other device.

The system under control 108 receives a control signal 114 that causes the system under control 108 to respond in some manner. The control signal 114 may vary depending upon the system under control, but in the example of the PID, the control signal 114 is about steady state until the process variable of a feedback signal 116 varies from the setpoint. At that point, the output of the process controller 102 is altered to force the process variable back to the set point. However, the feedback signal 116 includes periodic disturbances that may or may not be reflective of the process variable, but left in tact, the process controller 102 acts on these periodic disturbances as if they were deviations of the process variable from the setpoint. The feedback signal 116 may also include periodic disturbances that are not otherwise acted upon by the process controller 102, such as because they are beyond the bandwidth capabilities of the process controller 102. Specific examples of such behavior are discussed in more detail below.

To compensate for the effects of the periodic disturbances of the feedback signal 116, a process controller 104 that implements a frequency control process is also included in the configuration 100. This process controller 104 generates a compensation waveform 112 that compensates for the periodic disturbances by having the compensation waveform 112 be summed with a control signal 110 from process controller 102 via a summation node 106. The result is the control signal 114, which is provided as input to the system under control 108. While shown as a separate controller 104, it will be appreciated that the process controller 104 implementing the frequency control process may alternatively be integrated into the standard process controller 102 such that the control signal 110 and the compensation signal 114 are summed internally and the control signal 114 is output directly from the process controller 102.

Figure 2:
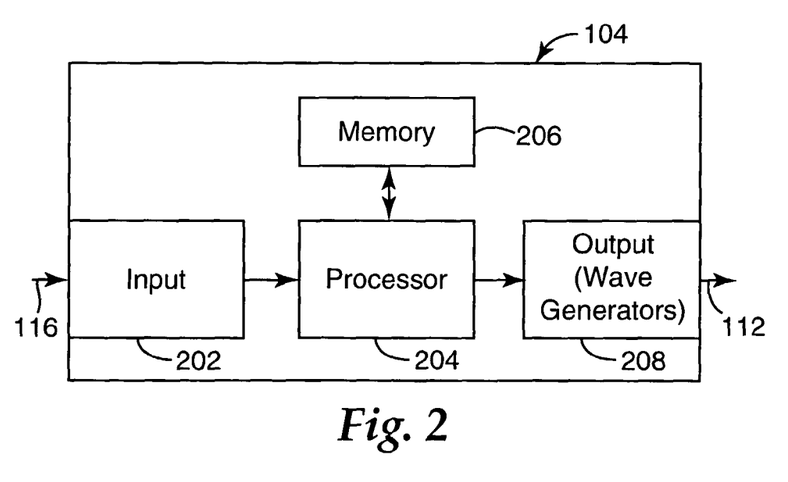
FIG. 2 shows one example of the components of a process controller that provides frequency control of the feedback signal.

FIG. 2 shows components of one example of the process controller 104 that implements the frequency control process. The process controller 104 includes an input 202. The input may be, for example, an analog-to-digital converter where the feedback signal 116 is in analog format and the processing is to be done in the digital domain. In that case, the input 202 samples the feedback signal 116 at a desired sampling rate. It will be appreciated that the sampling rate may vary but that the Nyquist rate may be followed for the highest frequency of interest. The data samples are provided to a processor 204, such as a general-purpose programmable processor or a hard-wired dedicated purpose processor. As another example, the input may simply be a counter for providing data to input registers of the processor 204 or may be the registers themselves.

The processor 204 performs a time domain to frequency domain transformation on the data samples, such as via a Fast Fourier Transform (FFT) or a Discrete Fourier Transform (DFT), to reveal the frequency components present in the feedback signal 116. The frequency components are identified in terms of their frequency, magnitude, and phase. As will be appreciated, the feedback signal may include waveforms having multiple frequency components, such as a square wave. The processor 204 detects each of the frequency components of the square wave or other complex waveform so that the appropriate compensation may be provided in relation to these complex waveforms of the feedback signal 116.

The processor 204 then instructs an output 208, such as a wave generator, to create a compensation waveform 112, i.e. a set of sine waves with each sine wave having a compensation magnitude and a compensation phase relative to each frequency component of the feedback signal 116. The compensation magnitude may start at a value that is approximately the magnitude of the measured frequency component, perhaps with a small increase to account for system attenuation. However, as discussed below, the compensation magnitude may be increased beyond the measured magnitude of the frequency component through multiple iterations until the frequency component is effectively cancelled. Likewise, the compensation phase may start at a value that is approximately the opposite phase of the measured frequency component, perhaps with a small amount of lead to account for system lag. However, as discussed below, the compensation phase may be altered, in addition to or separate from an alteration to the compensation magnitude, through multiple iterations until the frequency component is effectively cancelled.

The process controller 104 of this example also includes memory 206. This memory 206 may store a model frequency response of the system under control 108 that has been previously determined. Determining the model frequency response is discussed below in relation to FIG. 3. Furthermore, the memory 206 may be used to store the frequency components of one more previous iterations of the frequency control process so that a required change for the compensation waveform can be computed based on a current iteration and the result of the previous iteration, thereby allowing the process controller 104 to further refine the compensation magnitude and compensation phase of each frequency component until the frequency component is effectively cancelled.

Figure 3:
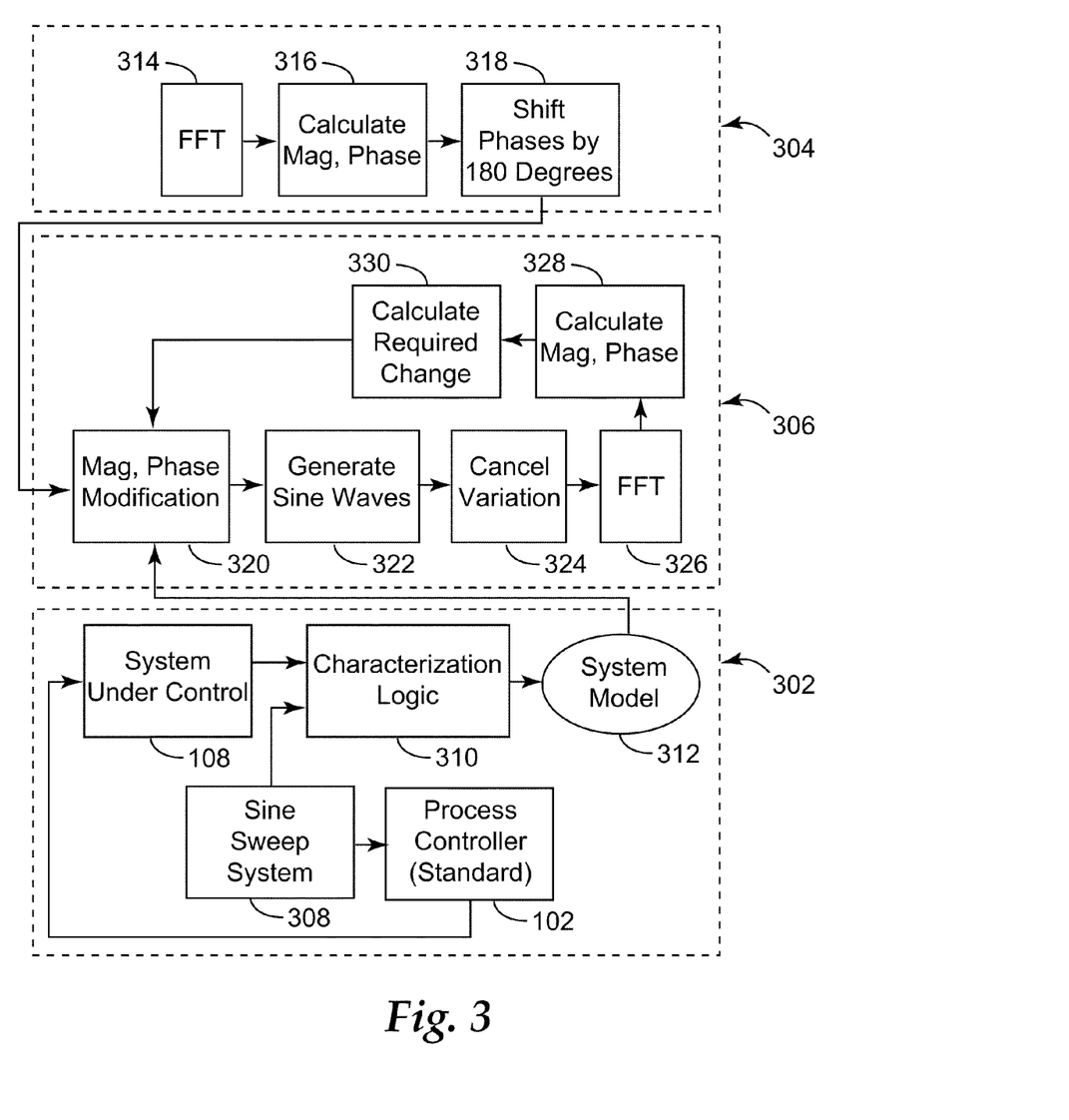
FIG. 3 shows an example of routines performed by the process controller to provide frequency control of the feedback signal.

FIG. 3 shows one example of the configuration of the frequency control process implemented with the process controller 104. This example of the frequency control process is divided into three separate stages, a preparatory stage 302, a start-up stage 304, and a continuous stage 306. It will be appreciated that frequency control may be implemented by applying fewer than all three of these stages. However, these three stages provide for a frequency control process that is effective on the first iteration as well as subsequent ones.

The preparatory phase 302 is intended to measure the magnitude and phase response, i.e. the model response, of the system 108 prior to the process starting so that this model response can be used to find the deviation caused by periodic disturbances during operation. A sine sweep system 308, such as the processor 204 and output wave generator 208 of the process controller 104, generates a series of single frequency sine wave reference signals, and each is sent one at a time to the process controller 102 which provides the control signal to the system under control 108. The feedback from the system under control 108 for each sine sweep frequency and the sine sweep frequency itself are provided to a characterization logic 310, which may also be implemented by the input 202 and processor 204 of the process controller 104. The characterization logic 310 then characterizes the system to find the model response by comparing the reference signal to the feedback signal for the given frequency to reveal the magnitude and phase relative to the reference signal. The system model 312, including each magnitude and phase for each of the various reference frequencies, is stored in memory 206.

The start-up phase 304 is intended to measure the frequency components present when the system under control 108 is in operation so that the periodic disturbances can be detected relative to the system model previously determined in the preparatory stage 302. During operation, the feedback signal 116 is sampled. The feedback signal 116 may be low pass filtered with a zero-phase filter to remove high frequency components that could cause aliasing. The FFT or other transformation 314 is applied to scan the input signal over a range of frequencies and to calculate the real and imaginary amplitudes. From the real and imaginary amplitudes, the calculation operation 316 is applied to find the magnitude and phase for each frequency present. The calculated phase of each frequency component is shifted by approximately 180 degrees at phase operation 318. This shift occurs because a phase difference of about 180 degrees is used for cancellation. The frequency component including the magnitude and shifted phase are then input for the beginning of the continuous phase 306.

The continuous phase 306 allows the periodic disturbances to be cancelled while allowing the frequency control process to be adaptive to changing conditions. For the first iteration of the continuous phase 306, a modification operation 320 receives as input the system model 312 from preparatory phase 302 as well as the frequency components including magnitude and shifted phase from the start-up phase 304. The modification operation 320 then performs a modification of the magnitude and shifted phase received from the start-up stage 304 based on the system model 312 from the preparatory stage 302. This is done because the system has some amount of attenuation and lag and the parameters to produce the compensation waveform 112 are modified to account for this attenuation and lag. Accordingly, the compensation magnitude of individual sine waves being created for each frequency component may be greater than that of the measured magnitude, while the compensation phase of the individual sine waves may be offset by 180 degrees plus some amount of lead. The sine waves for each frequency component are generated at wave operation 322 and summed to produce the compensation waveform 112, and the compensation waveform 112 is summed with the control signal 110 at cancellation operation 324 to thereby cancel the variation.

Because the model response 312 may not be perfect and because the frequency components may shift and new ones may appear, the continuous stage 306 continues to analyze the feedback signal 116. At transformation operation 326, the feedback signal is transformed to reveal the real and imaginary amplitudes, and then at calculation operation 328 the magnitude and phase of each remaining frequency component is found from the real and imaginary amplitudes. At calculation operation 330, the change necessary to more completely cancel the remaining frequency components and any new frequency components is found based on the frequency components used for cancellation in the previous iteration. Then, operational flow returns to modification operation 320 where the compensation magnitude and compensation phase are modified according to the changes necessary to improve the cancellation, and the operational flow continues as discussed above. Thus, the resulting compensation magnitude that provides the effective cancellation may be greater than the measured magnitude of the frequency component while the resulting compensation phase that provides the effective cancellation may be shifted by 180 degrees plus some degree of lead.

Figure 4:
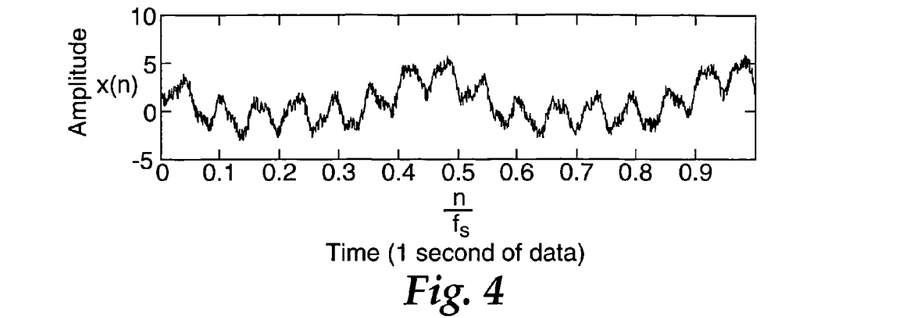
FIG. 4 shows an example of a time series of a feedback signal including periodic disturbances.

A specific example will now be discussed in relation to the FIGS. 4-7. FIG. 4 is a feedback signal that would typically be seen in an electric motor running that is turning at 60 rpm. As can be seen, the feedback signal is not steady state, but includes periodic disturbances. Upon the process controller 104 performing an analysis of the feedback signal, it can be seen that there are four frequency components of significance that are present as indicated by the magnitude plot of FIG. 5. While not germane to the operation of embodiments of the present invention, these four frequencies in this example can be traced back to a 2 Hz frequency of the feedback device, a 4 Hz frequency that is a secondary harmonic of the feedback device, a 16 Hz frequency that is pole ripple stemming from the 16 pole pairs of the electric motor, and a 36 Hz frequency that is motor slot ripple stemming from the 36 stator slots of the electric motor.

The time series shown in FIG. 4 may be expressed mathematically. The sampling frequency $f_s$ is 1000, the sample vector (n) is 0, 1 . . . , the amplitudes $A_1=2, A_2=1, A_3=1.5$, and $A_4=0.5$. The frequencies are $f_1=2$ Hz, $f_2=4$ Hz, $f_3=16$ Hz, and $f_4=36$ Hz. The phase offset is $\phi_1=31$ degrees, $\phi_2=53$ degrees, $\phi_3=124$ degrees, and $\phi_4=156$ degrees. Noise has been presumed to be 1.5 units. The general equation of x(n) follows:

$$x(n) := A_1 \cdot \cos\left[2 \cdot \pi \cdot f_1 \cdot \left(\frac{n}{f_s}\right) + \phi_1 \cdot \frac{\pi}{180}\right] + A_2 \cdot \cos\left[2 \cdot \pi \cdot f_2 \cdot \left(\frac{n}{f_s}\right) + \phi_2 \cdot \frac{\pi}{180}\right] + A_3 \cdot \cos\left[2 \cdot \pi \cdot f_3 \cdot \left(\frac{n}{f_s}\right) + \phi_3 \cdot \frac{\pi}{180}\right] \ldots + A_4 \cdot \cos\left[2 \cdot \pi \cdot f_4 \cdot \left(\frac{n}{f_s}\right) + \phi_4 \cdot \frac{\pi}{180}\right] + rnd(\text{noise})$$

Figure 5:
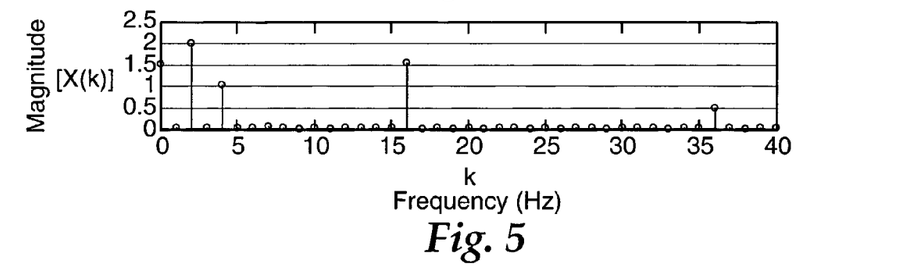
FIG. 5 shows an example of the frequency components including the magnitude of each that have been calculated from the time series of the feedback signal.
Figure 6:
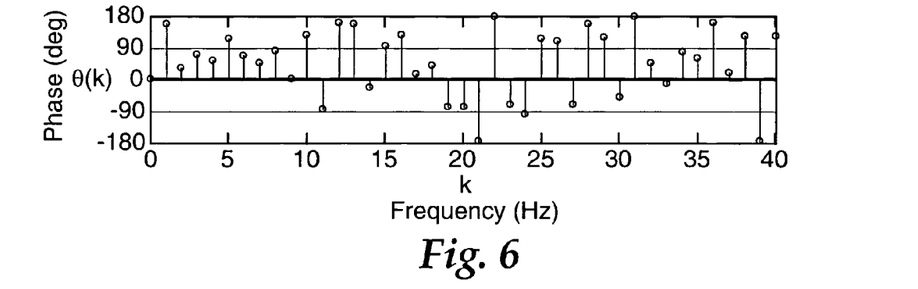
FIG. 6 shows an example of the frequency components including the phase of each that have been calculated from the time series of the feedback signal.

FIG. 5 shows the magnitude for each of these four frequencies while FIG. 6 shows the phase offset for all frequencies present including those of insignificant magnitude. For the four frequency components present, the FFT magnitude for $f_1$ is 2 units, for $f_2$ is 1 unit, for $f_3$ is 1 unit, and for $f_4$ is 0.5 units. The FFT phase for $f_1$ is 32 degrees, for $f_2$ is 53 degrees, for $f_3$ is 125 degrees, and for $f_4$ is 157 degrees.

The general equation for the magnitude X(k) follows:

$$X(k) := \frac{2}{N} \cdot \sum_{n=0}^{fs-1} x(n) \cdot W_N^{n \cdot k},$$

where $f_l := 0, f_u := 40, k := f_l, f_l + 1 \ldots f_u, N := f_s$, and where the equation for $W_N$ follows:

$$W_N := e^{-i \cdot \frac{2\pi}{N}}$$

The general equation for the phase θ(k) follows:

$$\phi(k) := \arg(X(k)) \cdot \frac{180}{\pi}$$

The compensation signal 112 includes the various sine waves at the frequencies, magnitudes and phases to compensate for each of the periodic disturbances. The compensation signal 112 includes the same frequencies and similar magnitudes as the disturbance frequency components but with the substantially opposite phase. Thus, the phase of the measured frequency components is shifted by approximately 180 degrees as discussed above, such that the phase offset (ph) for the waveforms of the compensation signal are $ph_1:=32+180=212$ degrees, $ph_2:=53+180=233$ degrees, $ph_3:=125+180=305$ degrees, and $ph_4:=157+180=337$ degrees. Each of the individual sine waves are added together to form the compensation signal, c(n), where φ represents the measured phase from x(n) plus the phase offset of 180 degrees plus any additional lead, and the general equation of c(n) follows:

$$c(n) := A_1 \cdot \cos\left[2 \cdot \pi \cdot f_1 \cdot \left(\frac{n}{f_s}\right) + \phi_1 \cdot \frac{\pi}{180}\right] + A_2 \cdot \cos\left[2 \cdot \pi \cdot f_2 \cdot \left(\frac{n}{f_s}\right) + \phi_2 \cdot \frac{\pi}{180}\right] + A_3 \cdot \cos\left[2 \cdot \pi \cdot f_3 \cdot \left(\frac{n}{f_s}\right) + \phi_3 \cdot \frac{\pi}{180}\right] \ldots + A_4 \cdot \cos\left[2 \cdot \pi \cdot f_4 \cdot \left(\frac{n}{f_s}\right) + \phi_4 \cdot \frac{\pi}{180}\right]$$

Figure 7:
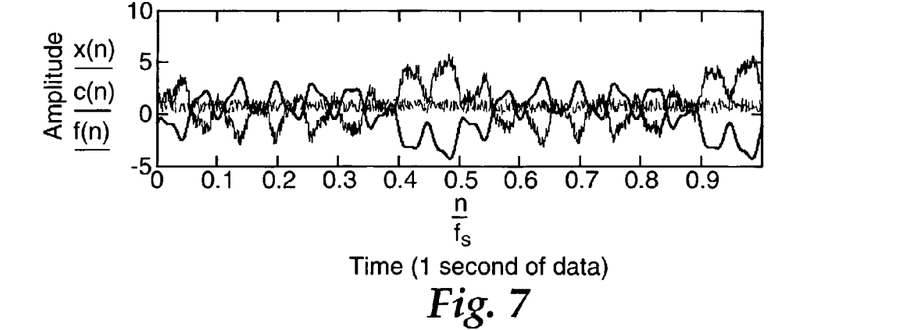
FIG. 7 shows the time series of the feedback signal, compensation signal, and resulting correction to the system under control.

The control signal that is provided to the system under control is the combination of the control signal from the standard process controller 102 with the compensation signal. FIG. 7 assumes a steady state PID control output at 0 that is disturbed by the feedback signal x(n). The compensation signal c(n) is also shown in FIG. 7. The result of the combination of the periodic disturbances of x(n) with the compensation signal c(n) is shown in FIG. 7 as f(n), where f(n):=x(n)+c(n). As can be seen, f(n) is returned to steady state, aside from the random noise, as the periodic disturbances of x(n) are cancelled by the compensation signal c(n).

In the context of an electric motor of a precision roll being controlled, the feedback is taken from the motor encoder, a sine encoder, a tachometer, a resolver, etc. The speed feedback is transformed to the frequency domain such that the destructive frequency components can be identified. Examples of periodic disturbances in this context include torque disturbances generated by motor couplings, bearings, pole pairs, slots in the stator, and current sensor gain offset of amplifiers. Periodic disturbances in this context also include position disturbances generated by the motor feedback device, gearboxes, out of round process rolls, etc. These periodic disturbances can be compensated for via the frequency control process described herein.

The embodiments discussed herein also compensate for frequencies that are modulating in amplitude and changing phase, as the continuous phase 306 of FIG. 3 is adaptive. One example where this situation presents itself is in the context of an electric motor of a precision roll where the motor is in-line with a gearbox that is connected to the roll that has precision bearings and/or bushings to maintain tolerances. Often, a once-around load variation is created by the low tolerance of the system. This, combined with a web tension on the roll will cause the motor to see a reverse load for part of the revolution and a forward (web direction) load during the rest of the revolution. In this case, the gearbox generates peak destructive frequencies when the motor is a full reverse load or at full forward load. The loading represents a sine wave pattern between the forward load and the reverse load. The backlash, shaft torsion, and coupling torsion cause a phase shift between the roll and the motor.

The embodiments discussed herein may also compensate for frequencies beyond the bandwidth of the standard process controller 102 of the system. This is accomplished by the increase in the magnitude and advancement of the phase of each waveform being generated for a corresponding frequency component of the feedback signal that occurs due to the closed loop nature of the frequency control process. Each iteration further reduces the amplitude of the frequency that is out of the bandwidth, so for example, the amplitude may be reduced by 50% on a first iteration, by 75% on a second, by 87.5% on t third, by 93.75% on a fourth, by 96.875% on a fifth, and by 99.999% after the Nth iteration. Thus, embodiments discussed herein may compensate for actual deviations of the process variable that may be otherwise unaccounted for by the standard process controller 102.

While the invention has been particularly shown and described with reference to various embodiments thereof, it will be understood by those skilled in the art that various other changes in the form and details may be made therein without departing from the spirit and scope of the invention.

What is claimed is:

1. A process controller, comprising:
   an input receiving a feedback signal from a system under control;
   a processor that determines the magnitude and phase of each frequency component of the feedback signal and generates a separate waveform for each frequency component wherein each waveform has a compensating magnitude and compensating phase relative to the corresponding frequency component; and
   an output generating each waveform and summing each waveform to a control signal output by a controller that acts upon the feedback signal to produce the control signal, wherein the summation of each waveform with the control signal compensates for the frequency components of the feedback signal.

2. A process controller comprising:
   an input receiving a feedback signal from a system under control;
   a processor for calculating the magnitude and phase of each frequency component of the feedback signal and for computing a separate waveform for each frequency component wherein each waveform has a compensating magnitude and compensating phase relative to the corresponding frequency component;
   memory storing a model response of the system under control including a magnitude and phase of each frequency component for the model response of the system under control, and wherein the processor generates the separate waveforms by determining a variation of the calculated magnitude and phase from the model magnitude and phase and
   an output device generating each waveform and summing each waveform to a control signal output by a controller that acts upon the feedback signal to produce the control signal, wherein the summation of each waveform with the control signal compensates for the frequency components of the feedback signal.

3. The process controller of claim 2, further comprising a sine sweep system that provides input to the system under control to determine the model frequency response.

4. The process controller of claim 2, wherein the processor calculates the magnitude and phase of each frequency component by performing a time domain to frequency domain transformation on the feedback signal.

5. The process controller of claim 4, wherein the time domain to frequency domain transformation is a Fast Fourier Transform.

6. A process controller comprising an input receiving a feedback signal from a system under control;
   a processor for calculating the magnitude and phase of each frequency component of the feedback signal and for computing a separate waveform for each frequency component, wherein each waveform has a compensating magnitude and compensating phase relative to the corresponding frequency component and the processor iterates the calculation of the magnitude and phase of each of the frequency components of the feedback signal and computation of the separate waveforms, memory storing the compensation magnitude and compensation phase of each frequency component for a previous iteration of calculation, and wherein the processor computes separate waveforms of a current iteration by determining a variation of the calculated magnitude and phase of the current iteration from the calculated magnitude and phase from the previous iteration, and an output generating each waveform and summing each waveform to a control signal output by a controller that acts upon the feedback signal to produce the control signal, wherein the summation of each waveform with the control signal compensates for the frequency components of the feedback signal.

7. A method of eliminating the effects of periodic disturbances within a control system, comprising:

sampling a feedback signal being produced by a system under control;

determining the frequency components and the magnitude and phase of each of the frequency components of the feedback signal by performing a time domain to frequency domain transformation on the feedback signal using Fast Fourier Transform or Discrete Fourier Transform;

generating a waveform for each frequency component that has a compensating magnitude and a compensating phase relative to each frequency component; and combining the waveforms for each of the frequency components to create a compensation waveform that is combined with a control signal, wherein the control signal is based on the feedback signal.

8. A method of eliminating the effects of periodic disturbances within a control system, comprising:

sampling a feedback signal produced by a system under control;

determining the frequency components and the magnitude and phase of each of the frequency components of the feedback signal by performing a time domain to frequency domain transformation on the feedback signal;

generating a waveform for each frequency component that has a compensating magnitude and a compensating phase relative to each frequency component;

storing a model response of the system under control including a magnitude and phase of each frequency component for the model response of the system under control, wherein generating the separate waveforms comprises determining a variation of the calculated magnitude and phase from the model magnitude and phase. and combining the waveforms for each of the frequency components to create a compensation waveform that is combined with a control signal, wherein the control signal is based on the feedback signal.

9. The method of claim 8, further comprising inputting a sine sweep to the system under control and calculating the model frequency response to the sine sweep.

10. A method of eliminating the effects of periodic disturbances within a control system, comprising:

sampling a feedback signal produced by a system under control;

determining the frequency components and the magnitude and phase of each of the frequency components of the feedback signal by performing a time domain to frequency domain transformation on the feedback signal;

generating a waveform for each frequency component that has a compensating magnitude and a compensating phase relative to each frequency component;

iterating the determining of the magnitude and phase of each of the frequency components of the feedback signal and the generating of the separate waveforms, storing the compensation magnitude and compensation phase of each frequency component for a previous iteration; and determining a variation of the determined magnitude and phase of the current iteration from the determined magnitude and phase from the previous iteration; and combining the waveforms for each of the frequency components to create a compensation waveform that is combined with a control signal, wherein the control signal is based on the feedback signal.

11. A controlled system including a feedback signal from a system under control and comprising:

a control system comprising a process controller that produces a compensation waveform which process controller comprises i) a processor for calculating the magnitude and phase of each frequency component of the feedback signal by performing a time domain to frequency domain transformation on the feedback signal and for generating compensating waveforms for each frequency component and ii) a memory storing a model response of the system under control including a magnitude and phase of each frequency component for the model response of the system under control, and a second controller that produces a control signal; and a system under control that receives a sum of the compensation waveform and the control signal and produces the feedback signal that is provided as input to the process controller and to the second controller, said feedback signal comprising frequency components, wherein the process controller calculates the magnitude and phase of the frequency components to produce compensating waveforms that have a compensating magnitude and a compensating phase relative to the frequency components, and the processor generates the compensating waveforms by determining a variation of the calculated magnitude and phase from the model magnitude and phase stored in memory.

12. The controlled system of claim 11, further comprising a sine sweep system that provides input to the system under control to determine the model frequency response.

13. The controlled system of claim 11, wherein the time domain to frequency domain transformation is a Fast Fourier Transform.

14. The controlled system of claim 11, wherein the time domain to frequency domain transformation is a Discrete Fourier Transform.

15. The controlled system of claim 11, wherein the second controller is a proportional, integral, derivative controller.

* * * * *

UNITED STATES PATENT AND TRADEMARK OFFICE
CERTIFICATE OF CORRECTION

| | | |
|---|---|---|
| PATENT NO. | : 8,000,817 B2 | Page 1 of 1 |
| APPLICATION NO. | : 11/575540 | |
| DATED | : August 16, 2011 | |
| INVENTOR(S) | : Spindler et al. | |

It is certified that error appears in the above-identified patent and that said Letters Patent is hereby corrected as shown below:

On the Title Pages, First Page in Column 2 under (Other Publications)
Line 3, delete "Engirieers," and insert -- Engineers, --, therefor.

On the Title Pages, Second Page, in Column 2 under (Other Publications)
Line 1, delete "Sinusoida" and insert -- Sinusoidal --, therefor.

Column 3
Line 22, delete "in tact," and insert -- intact, --, therefor.

Column 8
Line 43, in Claim 2, delete "phase and" and insert -- phase; and --, therefor.

Column 9
Line 51, in Claim 8, delete "phase." and insert -- phase; --, therefor.

Column 10
Line 31, in Claim 11, before "and ii)" insert -- ; --.

Signed and Sealed this
Eleventh Day of October, 2011

David J. Kappos
*Director of the United States Patent and Trademark Office*